United States Patent
Bigioi et al.

(10) Patent No.: US 8,379,917 B2
(45) Date of Patent: Feb. 19, 2013

(54) FACE RECOGNITION PERFORMANCE USING ADDITIONAL IMAGE FEATURES

(75) Inventors: Petronel Bigioi, Galway (IE); Gabriel Costache, Galway (IE); Alexandru Drimbarean, Galway (IE); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 368 days.

(21) Appl. No.: 12/572,930

(22) Filed: Oct. 2, 2009

(65) Prior Publication Data

US 2011/0081052 A1    Apr. 7, 2011

(51) Int. Cl.
G06K 9/00    (2006.01)
(52) U.S. Cl. ............................................. 382/103
(58) Field of Classification Search ............ None
See application file for complete search history.

(56) References Cited

U.S. PATENT DOCUMENTS

| | | |
|---|---|---|
| 4,047,187 A | 9/1977 | Mashimo et al. |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,638,364 A | 1/1987 | Hiramatsu |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |

(Continued)

FOREIGN PATENT DOCUMENTS

EP    578508 A2    1/1994

OTHER PUBLICATIONS

Batur et al., "Adaptive Active Appearance Models", IEEE Transactions on Image Processing, 2005, pp. 1707-1721, vol. 14-Issue 11.

(Continued)

*Primary Examiner* — Andrew W Johns
*Assistant Examiner* — David F Dunphy
(74) *Attorney, Agent, or Firm* — Andrew V. Smith

(57) ABSTRACT

A technique is provided for recognizing faces in an image stream using a digital image acquisition device. A first acquired image is received from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, and the first peripheral region data are associated with the first face region. The first face region is tracked until a face lock is lost. A second face region is detected within a second acquired image from the image stream. Second peripheral region data around the second face region are extracted. The second face region is identified upon matching the first and second peripheral region data.

39 Claims, 2 Drawing Sheets

U.S. PATENT DOCUMENTS

| | | |
|---|---|---|
| 5,227,837 A | 7/1993 | Terashita |
| 5,278,923 A | 1/1994 | Nazarathy et al. |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,543,952 A | 8/1996 | Yonenaga et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,748,764 A | 5/1998 | Benati et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,912,980 A | 6/1999 | Hunke |
| 5,966,549 A | 10/1999 | Hara et al. |
| 5,978,519 A | 11/1999 | Bollman et al. |
| 5,990,973 A | 11/1999 | Sakamoto |
| 5,991,456 A | 11/1999 | Rahman et al. |
| 6,009,209 A | 12/1999 | Acker et al. |
| 6,016,354 A | 1/2000 | Lin et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,115,052 A | 9/2000 | Freeman et al. |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,292,575 B1 | 9/2001 | Bortolussi et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,714,665 B1 | 3/2004 | Hanna et al. |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,798,834 B1 | 9/2004 | Murakami et al. |
| 6,801,250 B1 | 10/2004 | Miyashita |
| 6,801,642 B2 | 10/2004 | Gorday et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,027,621 B1 | 4/2006 | Prokoski |
| 7,034,848 B2 | 4/2006 | Sobol |

| | | | |
|---|---|---|---|
| 7,035,456 B2 | 4/2006 | Lestideau | |
| 7,035,462 B2 | 4/2006 | White et al. | |
| 7,035,467 B2 | 4/2006 | Nicponski | |
| 7,038,709 B1 | 5/2006 | Verghese | |
| 7,038,715 B1 | 5/2006 | Flinchbaugh | |
| 7,039,222 B2 | 5/2006 | Simon et al. | |
| 7,042,501 B1 | 5/2006 | Matama | |
| 7,042,505 B1 | 5/2006 | DeLuca | |
| 7,042,511 B2 | 5/2006 | Lin | |
| 7,043,056 B2 | 5/2006 | Edwards et al. | |
| 7,043,465 B2 | 5/2006 | Pirim | |
| 7,050,607 B2 | 5/2006 | Li et al. | |
| 7,057,653 B1 | 6/2006 | Kubo | |
| 7,064,776 B2 | 6/2006 | Sumi et al. | |
| 7,082,212 B2 | 7/2006 | Liu et al. | |
| 7,099,510 B2 | 8/2006 | Jones et al. | |
| 7,106,374 B1 | 9/2006 | Bandera et al. | |
| 7,106,887 B2 | 9/2006 | Kinjo | |
| 7,110,569 B2 | 9/2006 | Brodsky et al. | |
| 7,110,575 B2 | 9/2006 | Chen et al. | |
| 7,113,641 B1 | 9/2006 | Eckes et al. | |
| 7,119,838 B2 | 10/2006 | Zanzucchi et al. | |
| 7,120,279 B2 | 10/2006 | Chen et al. | |
| 7,146,026 B2 | 12/2006 | Russon et al. | |
| 7,151,843 B2 | 12/2006 | Rui et al. | |
| 7,158,680 B2 | 1/2007 | Pace | |
| 7,162,076 B2 | 1/2007 | Liu | |
| 7,162,101 B2 | 1/2007 | Itokawa et al. | |
| 7,171,023 B2 | 1/2007 | Kim et al. | |
| 7,171,025 B2 | 1/2007 | Rui et al. | |
| 7,190,829 B2 | 3/2007 | Zhang et al. | |
| 7,194,114 B2 | 3/2007 | Schneiderman | |
| 7,200,249 B2 | 4/2007 | Okubo et al. | |
| 7,218,759 B1 | 5/2007 | Ho et al. | |
| 7,227,976 B1 | 6/2007 | Jung et al. | |
| 7,254,257 B2 | 8/2007 | Kim et al. | |
| 7,274,822 B2 | 9/2007 | Zhang et al. | |
| 7,274,832 B2 | 9/2007 | Nicponski | |
| 7,289,664 B2 | 10/2007 | Enomoto | |
| 7,295,233 B2 | 11/2007 | Steinberg et al. | |
| 7,315,630 B2 | 1/2008 | Steinberg et al. | |
| 7,315,631 B1 | 1/2008 | Corcoran et al. | |
| 7,317,815 B2 | 1/2008 | Steinberg et al. | |
| 7,321,670 B2 | 1/2008 | Yoon et al. | |
| 7,324,670 B2 | 1/2008 | Kozakaya et al. | |
| 7,324,671 B2 | 1/2008 | Li et al. | |
| 7,336,821 B2 | 2/2008 | Ciuc et al. | |
| 7,336,830 B2 | 2/2008 | Porter et al. | |
| 7,352,394 B1 | 4/2008 | DeLuca et al. | |
| 7,362,210 B2 | 4/2008 | Bazakos et al. | |
| 7,362,368 B2 | 4/2008 | Steinberg et al. | |
| 7,403,643 B2 | 7/2008 | Ianculescu et al. | |
| 7,437,998 B2 | 10/2008 | Burger et al. | |
| 7,440,593 B1 | 10/2008 | Steinberg et al. | |
| 7,460,695 B2 | 12/2008 | Steinberg et al. | |
| 7,469,055 B2 | 12/2008 | Corcoran et al. | |
| 7,515,740 B2 | 4/2009 | Corcoran et al. | |
| 7,683,946 B2 | 3/2010 | Steinberg et al. | |
| 7,738,015 B2 | 6/2010 | Steinberg et al. | |
| 7,809,162 B2 | 10/2010 | Steinberg et al. | |
| 2001/0000025 A1* | 3/2001 | Darrell et al. | 382/103 |
| 2001/0005222 A1 | 6/2001 | Yamaguchi | |
| 2001/0028731 A1 | 10/2001 | Covell et al. | |
| 2001/0031142 A1 | 10/2001 | Whiteside | |
| 2001/0038712 A1 | 11/2001 | Loce et al. | |
| 2001/0038714 A1 | 11/2001 | Masumoto et al. | |
| 2002/0105662 A1 | 8/2002 | Patton et al. | |
| 2002/0106114 A1 | 8/2002 | Yan et al. | |
| 2002/0114535 A1 | 8/2002 | Luo | |
| 2002/0118287 A1 | 8/2002 | Grosvenor et al. | |
| 2002/0136433 A1 | 9/2002 | Lin | |
| 2002/0141640 A1 | 10/2002 | Kraft | |
| 2002/0150662 A1 | 10/2002 | Dewis et al. | |
| 2002/0168108 A1 | 11/2002 | Loui et al. | |
| 2002/0172419 A1 | 11/2002 | Lin et al. | |
| 2002/0181801 A1 | 12/2002 | Needham et al. | |
| 2002/0191861 A1 | 12/2002 | Cheatle | |
| 2003/0012414 A1 | 1/2003 | Luo | |
| 2003/0023974 A1 | 1/2003 | Dagtas et al. | |
| 2003/0025812 A1 | 2/2003 | Slatter | |
| 2003/0035573 A1 | 2/2003 | Duta et al. | |
| 2003/0044070 A1 | 3/2003 | Fuersich et al. | |
| 2003/0044177 A1 | 3/2003 | Oberhardt et al. | |
| 2003/0048950 A1 | 3/2003 | Savakis et al. | |
| 2003/0052991 A1 | 3/2003 | Stavely et al. | |
| 2003/0059107 A1 | 3/2003 | Sun et al. | |
| 2003/0059121 A1 | 3/2003 | Savakis et al. | |
| 2003/0071908 A1 | 4/2003 | Sannoh et al. | |
| 2003/0084065 A1 | 5/2003 | Lin et al. | |
| 2003/0095197 A1 | 5/2003 | Wheeler et al. | |
| 2003/0107649 A1 | 6/2003 | Flickner et al. | |
| 2003/0118216 A1 | 6/2003 | Goldberg | |
| 2003/0123713 A1 | 7/2003 | Geng | |
| 2003/0123751 A1 | 7/2003 | Krishnamurthy et al. | |
| 2003/0142209 A1 | 7/2003 | Yamazaki et al. | |
| 2003/0151674 A1 | 8/2003 | Lin | |
| 2003/0174773 A1 | 9/2003 | Comaniciu et al. | |
| 2003/0202715 A1 | 10/2003 | Kinjo | |
| 2004/0022435 A1 | 2/2004 | Ishida | |
| 2004/0041121 A1 | 3/2004 | Yoshida et al. | |
| 2004/0095359 A1 | 5/2004 | Simon et al. | |
| 2004/0114904 A1 | 6/2004 | Sun et al. | |
| 2004/0120391 A1 | 6/2004 | Lin et al. | |
| 2004/0120399 A1 | 6/2004 | Kato | |
| 2004/0125387 A1 | 7/2004 | Nagao et al. | |
| 2004/0170397 A1 | 9/2004 | Ono | |
| 2004/0175021 A1 | 9/2004 | Porter et al. | |
| 2004/0179719 A1 | 9/2004 | Chen et al. | |
| 2004/0218832 A1 | 11/2004 | Luo et al. | |
| 2004/0223063 A1 | 11/2004 | DeLuca et al. | |
| 2004/0228505 A1 | 11/2004 | Sugimoto | |
| 2004/0233301 A1 | 11/2004 | Nakata et al. | |
| 2004/0234156 A1 | 11/2004 | Watanabe et al. | |
| 2005/0013479 A1 | 1/2005 | Xiao et al. | |
| 2005/0013603 A1 | 1/2005 | Ichimasa | |
| 2005/0018923 A1 | 1/2005 | Messina et al. | |
| 2005/0031224 A1 | 2/2005 | Prilutsky et al. | |
| 2005/0041121 A1 | 2/2005 | Steinberg et al. | |
| 2005/0068446 A1 | 3/2005 | Steinberg et al. | |
| 2005/0068452 A1 | 3/2005 | Steinberg et al. | |
| 2005/0069208 A1 | 3/2005 | Morisada | |
| 2005/0089218 A1 | 4/2005 | Chiba | |
| 2005/0104848 A1 | 5/2005 | Yamaguchi et al. | |
| 2005/0105780 A1 | 5/2005 | Ioffe | |
| 2005/0128518 A1 | 6/2005 | Tsue et al. | |
| 2005/0140801 A1 | 6/2005 | Prilutsky et al. | |
| 2005/0185054 A1 | 8/2005 | Edwards et al. | |
| 2005/0275721 A1 | 12/2005 | Ishii | |
| 2006/0006077 A1 | 1/2006 | Mosher et al. | |
| 2006/0008152 A1 | 1/2006 | Kumar et al. | |
| 2006/0008171 A1 | 1/2006 | Petschnigg et al. | |
| 2006/0008173 A1 | 1/2006 | Matsugu et al. | |
| 2006/0018517 A1 | 1/2006 | Chen et al. | |
| 2006/0029265 A1 | 2/2006 | Kim et al. | |
| 2006/0039690 A1 | 2/2006 | Steinberg et al. | |
| 2006/0050933 A1 | 3/2006 | Adam et al. | |
| 2006/0056655 A1 | 3/2006 | Wen et al. | |
| 2006/0093212 A1 | 5/2006 | Steinberg et al. | |
| 2006/0093213 A1 | 5/2006 | Steinberg et al. | |
| 2006/0093238 A1 | 5/2006 | Steinberg et al. | |
| 2006/0098875 A1 | 5/2006 | Sugimoto | |
| 2006/0098890 A1 | 5/2006 | Steinberg et al. | |
| 2006/0120599 A1 | 6/2006 | Steinberg et al. | |
| 2006/0133699 A1 | 6/2006 | Widrow et al. | |
| 2006/0140455 A1 | 6/2006 | Costache et al. | |
| 2006/0147192 A1 | 7/2006 | Zhang et al. | |
| 2006/0153472 A1 | 7/2006 | Sakata et al. | |
| 2006/0177100 A1 | 8/2006 | Zhu et al. | |
| 2006/0177131 A1 | 8/2006 | Porikli | |
| 2006/0187305 A1 | 8/2006 | Trivedi et al. | |
| 2006/0203106 A1 | 9/2006 | Lawrence et al. | |
| 2006/0203107 A1 | 9/2006 | Steinberg et al. | |
| 2006/0204034 A1 | 9/2006 | Steinberg et al. | |
| 2006/0204055 A1 | 9/2006 | Steinberg et al. | |
| 2006/0204056 A1 | 9/2006 | Steinberg et al. | |
| 2006/0204058 A1 | 9/2006 | Kim et al. | |
| 2006/0204110 A1 | 9/2006 | Steinberg et al. | |
| 2006/0210264 A1 | 9/2006 | Saga | |

| | | |
|---|---|---|
| 2006/0227997 A1 | 10/2006 | Au et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0076921 A1* | 4/2007 | Living .................. 382/118 |
| 2007/0091203 A1 | 4/2007 | Peker et al. |
| 2007/0098218 A1* | 5/2007 | Zhang et al. .............. 382/103 |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |
| 2007/0263104 A1 | 11/2007 | DeLuca et al. |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0019565 A1 | 1/2008 | Steinberg |
| 2008/0037839 A1 | 2/2008 | Corcoran et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1 | 9/2008 | Blonk et al. |
| 2008/0240555 A1 | 10/2008 | Nanu et al. |
| 2008/0267461 A1 | 10/2008 | Ianculescu et al. |
| 2009/0002514 A1 | 1/2009 | Steinberg et al. |
| 2009/0003652 A1 | 1/2009 | Steinberg et al. |
| 2009/0003708 A1 | 1/2009 | Steinberg et al. |
| 2009/0052749 A1 | 2/2009 | Steinberg et al. |
| 2009/0087030 A1 | 4/2009 | Steinberg et al. |
| 2009/0324008 A1* | 12/2009 | Kongqiao et al. ............ 382/103 |
| 2011/0157370 A1* | 6/2011 | Livesey .................. 348/169 |

OTHER PUBLICATIONS

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9-Issue 2.

Corcoran, P. et al., "Automatic Indexing of Consumer Image Collections Using Person Recognition Techniques", Digest of Technical Papers. International Conference on Confumer Electronics, 2005, pp. 127-128.

Costache, G. et al., "In-Camera Person Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53-Issue 2, Blackwell Publishing for the Royal Satistical Society.

Heisele, B. et al., "Hierarchical Classification and Feature Reduction for Fast Face Detection with Support Vector Machines", Pattern Recognition, 2003, pp. 2007-2017, vol. 36-Issue 9, Elsevier.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Nayak et al., "Automatic illumination correction for scene enhancement and objection tracking, XP005600656, ISSN: 0262-8856", Image and Vision Computing, 2006, pp. 949-959, vol. 24-Issue 9.

Turk, Matthew et al., "Eigenfaces for Recognition", Journal of Cognitive Neuroscience, 1991, 17 pgs, vol. 3-Issue 1.

PCT Notification of Transmittal of the International Search Report and the Written Opinion of the International Searching Authority, or the Declaration, for PCT Application No. PCT/EP2010/063293, dated Nov. 12, 2010, 13 pages.

Charay Lerdsudwichai, Mohamed Abdel-Mottaleb and A-Nasser Ansari, Tracking multiple people with recovery from partial and total occlusion, Pattern Recognition, vol. 38, Issue 7, Jul. 2005, pp. 1059-1070, ISSN: 0031-3203 doi>10.1016/j.patcog.2004.11.022.

Xuefeng Song, and Ram Nevatia, Combined Face-Body Tracking in Indoor Environment, Pattern Recognition, 2004. ICPR 2004, Proceedings of the 17th International Conference on Cambridge, UK Aug. 23-26, 2004, Piscataway, NJ, USA, IEEE, LNKDDOI: 10.1109/Icpr2004.1333728, vol. 4, Aug. 23, 2004, pp. 159-162, Xp010723886, ISBN: 978-0-7695-2128-2.

Mark Everingham, Josef Sivic and Andrew Zisserman, "Hello! My name is . . . Buffy"—Automatic Naming of Characters in TV Video, Proceedings of the British Machine Vision, Conference (2006), Jan. 1, 2006, pp. 1-10, XP009100754.

Ming Yang, Fengjun LV, Wei XU, and Yihong Gong, Detection Driven Adaptive Multi-cue Integration for Multiple Human Tracking, IEEE 12th International Conference on Computer Vision (ICCV), Sep. 30, 2009, pp. 1554-1561, XP002607967.

Hieu T. Nguyen, and Arnold W. Smeulders, Robust Tracking Using Foreground-Background Texture Discrimination, International Journal of Computer Vision, Kluwer Academic Publishers, BO LNKD-DOI:10.1007/S11263-006-7067-X, vol. 69, No. 3, May 1, 2006, pp. 277-293, XP019410143, ISSN: 1573-1405.

Gael Jaffre and Philippe Joly, Improvement of a Person Labelling Method Using Extracted Knowledge on Costume, Jan. 1, 2005, Computer Analysis of Images and Patterns Lecture Notes in Computer Science; LNCS, Springer, Berlin, DE, pp. 489-497, XP019019231, ISBN: 978-3-540-28969-2.

* cited by examiner

FACE RECOGNITION PERFORMANCE USING ADDITIONAL IMAGE FEATURES

BACKGROUND

Face tracking is a recent innovation in digital cameras and related consumer imaging devices such as camera phones and handheld video cameras. Face tracking technologies have been improving to where they can detect and track faces at up to 60 fps (see, e.g., U.S. Pat. Nos. 7,403,643, 7,460,695, 7,315,631, 7,460,694, and 7,469,055, and US publications 2009/0208056, 2008/0267461 and U.S. Ser. No. 12/063,089, which are all assigned to the same assignee and are incorporated by reference). Users have now come to expect high levels of performance from such in-camera technology.

Faces are initially detected using a face detector, which may use a technique such as that described by Viola-Jones which use rectangular Haar classifiers (see, e.g., US2002/0102024 and Jones, M and Viola, P., "Fast multi-view face detection," Mitsubishi Electric Research Laboratories, 2003.

Once a face is detected, its location is recorded and a localized region around that face is scanned by a face detector in the next frame. Thus, once a face is initially detected, it can be accurately tracked from frame to frame without a need to run a face detector across the entire image. The "located" face is said to be "locked" by the face tracker. Note that it is still desirable to scan the entire image or at least selected portions of the image with a face detector as a background task in order to locate new faces entering the field of view of the camera. However, even when a "face-lock" has been achieved, the localized search with a face detector may return a negative result even though the face is still within the detection region. This can happen because the face has been turned into a non-frontal, or profile pose, facing instead either too much up, down, left or right to be detected. That is, a typical face detector can only accurately detect faces in a semi-frontal pose. Face lock may also be lost due to sudden changes in illumination conditions, e.g. backlighting of a face as it passes in front of a source of illumination, among other possibilities such as facial distortions and occlusions by other persons or objects in a scene.

Face Recognition in Cameras

Now that face detection has been quickly adopted as a "must-have" technology for digital cameras, many engineers have begun to consider the problem of performing more sophisticated face analysis within portable imaging devices. Perhaps the most desired of these is to recognize and distinguish between the individual subjects within an image, or to pick out the identity of a particular individual, for example, from a stored set of friends & family members. These applications are examples of what may be referred to generically as face recognition.

Forensic Face Recognition

Face recognition is known from other fields of research. In particular it is known from the areas of law enforcement and from applications relating in immigration control and in the recognition of suspected terrorists at border crossing. Face recognition is also used in applications in gaming casinos and in a range of commercial security applications.

Most of these applications fall into a sub-category of face recognition that may be referred to as forensic face recognition. In such applications a large database of images acquired under controlled conditions—in particular controlled frontal pose and regulated diffuse illumination—is used to train a set of optimal basis functions for a face. When a new face is acquired, it is analyzed in terms of these basis functions. A facial pattern, or faceprint, is obtained and matched against the recorded patterns of all other faces from this large database (see, e.g., U.S. Pat. Nos. 7,551,755, 7,558,408, 7,587,068, 7,555,148, and 7,564,994, which are assigned to the same assignee and incorporated by reference). Thus, an individual can be compared with the many individuals from a law-enforcement database of known criminals, or some other domestic or international law-enforcement database of known persons of interest. Such system relies on the use of a large back-end database and powerful computing infrastructure to facilitate a large number of pattern matching comparisons.

Face Recognition in Consumer Devices

In consumer electronics, the use of face recognition is clearly somewhat different in nature than in say law enforcement or security. To begin with, the nature and implementation of face recognition is influenced by a range of factors which cannot be controlled to the same extent as in forensic applications, such as: (i) there are significant variations in the image acquisition characteristics of individual handheld imaging devices resulting in variable quality of face regions; (ii) image acquisition is uncontrolled and thus faces are frequently acquired at extremes of pose and illumination; (iii) there is not a suitable large database of pre-acquired images to facilitate training; (iv) there is not control on the facial appearance of individuals so people can wear different make-up, hairstyles, glasses, beards, etc; (v) devices are often calibrated to match local demographics or climate conditions—e.g. cameras in California normally expect sunny outdoor conditions, whereas in Northern Europe cloudy, overcast conditions are the norm, and thus the default white balance in these locations will be calibrated differently; (vi) faces are typically acquired against a cluttered background, making it difficult to accurately extract face regions for subsequent analysis. Additional discussion can be found, for example, in Automated sorting of consumer image collections using face and peripheral region image classifiers, IEEE Transactions on Consumer Electronics, Vol. 51, No. 3, August 2005, pp. 747-754 (Corcoran, P.; Costache, G.). and in US 20060140455, Method and component for image recognition to Corcoran et al.

From the above discussion, it can be understood that on a handheld imaging device the face recognition process may be significantly less reliable than in a typical forensic face recognition system. The acquisition of face regions produces less reliable face regions for analysis, the handheld device can hold a much smaller dataset of face patterns for comparison, and the training of new faces typically relies on data input from the user of a camera who may not be professionally trained and may not capture optimal images for training.

SUMMARY OF THE INVENTION

A technique is provided for recognizing faces in an image stream using a digital image acquisition device. A first acquired image is received from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, and the first peripheral region data are associated with the first face region. The first face region is tracked until a face lock is lost. A second face region is detected within a second acquired image from the image stream. Second peripheral region data around the second face region are extracted. The second face region is identified upon matching the first and second peripheral region data.

The storing of peripheral region data may occur within volatile memory.

A database may be provided with an identifier and associated parameters for each of a number of one or more faces to be recognized. Using the database, face recognition may be selectively applied to the first face region to provide an identifier for the first face region Second faceprint data uniquely identifying the second face region may be extracted. The first and second faceprint data may be matched, thereby confirming the identifying of the second face region. If they do not match, the identifying of the second face region as being the same as the first face region is discontinued.

Texture information may be retrieved and matched from the first and second peripheral region data.

The detecting and identifying of the second face region may occur within two seconds, or within one second, or less.

A same identifier may be displayed along with the first and second face regions. The identifier may include a nickname of a person associated with the first and second face regions.

Another method is provided for recognizing faces in an image stream using a digital image acquisition device. A first acquired image is acquired from an image stream. A first face region is detected within the first acquired image having a given size and a respective location within the first acquired image. First faceprint data uniquely identifying the first face region are extracted along with first peripheral region data around the first face region. The first faceprint and peripheral region data are stored, including associating the first peripheral region data with the first face region. A first face region combination, including the first face region and peripheral region data, is tracked until face lock is lost. The first face region is identified.

A database may be provided with an identifier and associated parameters for each of a number of one or more faces to be recognized. Using the database, face recognition may be selectively applied to the first face region to provide an identifier for the first face region.

Texture information may be retrieved and matched from the first and second peripheral region data.

The image stream may include two or more relatively low resolution reference images.

The image stream may include a series of reference images of nominally a same scene of a main acquired image, such as two or more preview or postview images, and/or one or more images whose exposure period overlaps some part of the exposure duration of a main acquired image.

One or more processor-readable storage media are also provided herein having code embedded therein for programming a processor to perform any of the methods described herein.

A portable, digital image acquisition device is also provided herein, including a lens and image sensor for acquiring digital images, a processor, and a processor-readable medium having code embedded therein for programming the processor to perform any of the methods described herein.

DETAILED DESCRIPTION OF THE EMBODIMENTS

Figure 1:
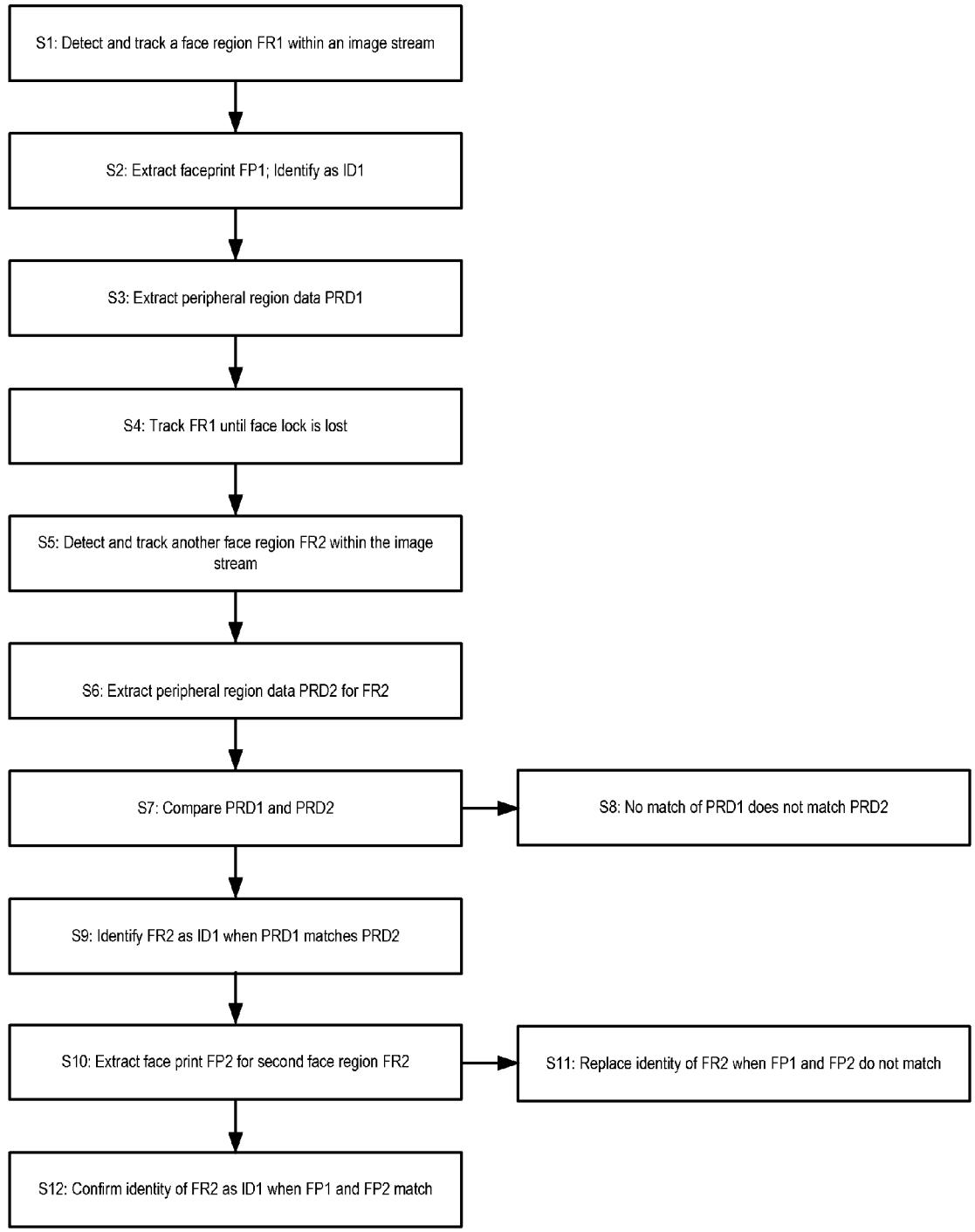
FIG. 1 illustrates exemplary processes in accordance with certain embodiments.

Techniques are described below for improving the performance of an internal person recognition algorithm by using a combination of features extracted from face regions, as well as extra features extracted from regions adjacent to the face, around the face, surrounding the face, proximate to the face, just above, below or to the side of the face, at the periphery of the face. Herein, the term "peripheral regions" shall be used and is intended to include regions adjacent to the face, around the face, surrounding the face, proximate to the face, just above, below, in front, behind or to the side of the face, and/or at the periphery of the face. These extra, peripheral features can tend to be quite invariant to acquisition conditions and can be used, on a temporary basis, for person identification, and/or specifically to maintain a face-lock of a tracked face that is temporarily not detected but will reappear in an image stream upon resuming a more appropriate illumination, direction, pose, orientation or tilt relative to the camera and/or lighting.

The performance of in-camera face identification technology will typically decrease when there are differences in illumination, face pose and/or expression between the current face to be recognized and the face image used for learning the identity of a person. To improve the identification performance, we propose to use information from peripheral regions of the image surrounding the main face. For example, these regions may contain information about clothing, jewelry or electronic equipment being used, cigarette, gum chewing, whistling, shouting, singing, shape of neck and/or shoulders relative to face, shape of face or a feature of the face, scar, tattoo, bandage, brightness, color or tone of face, of a face feature or of a peripheral region, hairstyle, hair color, degree of hair loss, hair covering, toupee, hair on face, in ears or nose or on chest or neck, a hat or helmet, face mask, glasses, umbrella, name tag, label on clothing, or any of a wide variety of other items or features that may distinguish a "peripheral region" around a person's face, which can be used to compliment the identification of an individual.

Certain embodiments described herein are based on using facial features that are sensitive to small variations in face pose, tilt, expression and/or size, or other factors. An advantage is robustness to face variations in pose, tilt, expression and/or size as well as facial occlusions. Very short identification times are achieved.

Current problems with existing solutions are mitigated in certain embodiments described herein by using smart processing techniques. In certain embodiments, these take advantage of technologies now available within state-of-art digital cameras. In particular, multiple face regions may be extracted and pre-filtered from a preview image stream until face regions which are suitable (e.g., with regard to frontal pose and constant illumination) are obtained. Then, the actual pattern matching process of face recognition is initiated.

User Expectations for Face Recognition

Challenges are introduced by the expectations of camera users. It is desired to have a camera with a real-time face tracking facility that can detect and independently track up to nine or more faces in real-time. User expectations for face recognition are and will continue to be quite high. It is further desired not only that a camera will correctly recognize a face captured in a still image, but also that the camera can recognize a face as it tracks the face prior to capturing a still image.

Now, an in-camera recognition algorithm may typically take several tens of seconds to extract, pre-process and then achieve a reliable initial recognition of a face region. After a camera is first pointed at a scene with several face images, it has been acceptable to have a delay of this order of magnitude. It has been understood by the user that the camera has to "think" about the different faces before it reaches a decision as to the identity of each. However, once the camera has identified a person, it is desired that subsequent recognitions and/or maintaining recognition during tracking should not present serious further delays.

With an analogy being face detection versus face-tracking, where the initial detection takes more time than tracking in subsequent frames, it is desired that while initially recognizing a face region in a preview stream may present some initial delay, it is desired to continue to hold a "face-lock" of a recognized face with the tracking algorithm; maintaining a "memory" of this face. However, when a recognized face leaves the current imaging scene and then re-enters it a short while later, it is desired not to have to repeat the same initial face recognition delays. In the past, a background face detection algorithm would find the face within a second or two, and the face recognition algorithm would not recall the identity of that person within the same time-frame and have to initiate recognition again with unacceptable delays. Thus, the camera is considered to have forgotten the person even though they only left the imaging scene for a few seconds.

In embodiments herein, information contained within peripheral regions, that is, regions of the image surrounding the main face region, are used to improve and refine the sorting of images containing faces (see Automated sorting of consumer image collections using face and peripheral region image classifiers, *IEEE Transactions on Consumer Electronics*, Vol. 51, No. 3, August 2005, pp. 747-754 (Corcoran, P.; Costache, G.). and in US 20060140455, Method and component for image recognition to Corcoran et al., incorporated by reference). In particular these regions contain information that can be used to compliment the identification of an individual, so that sufficient information is maintained throughout the face tracking to maintain face-lock even when the face region itself is not optimally directed, is blocked or partially blocked, and/or illuminated unevenly and/or insufficiently or overly illuminated.

It is noted that in certain embodiments the peripheral regions may be tracked, along with the face regions, and not lost in the first place such that recovery is not necessary. In other embodiments, the peripheral regions are quickly detected after loss of face lock, such that the face detector and face recognition components know to look for the specific face that was lost in the vicinity of the detected peripherals regions. Either way, re-initiating face detection and recognition for the previously identified face is obviated by an advantageous embodiment described herein.

A challenge is to increase the speed at which the identity of a face is recovered after a "face-lock" is lost, or if a face-lock being lost entails initiating face recognition from the beginning, then to increase the duration, proportion and/or probability of maintenance of face-lock over the image stream at least while the particular face actually remains within the scene being imaged with the camera. Again, as re-initiating face recognition is too slow and can lead to gaps of tens of seconds while a suitable new face region is obtained and recognized, it is advantageous as described in embodiments herein to detect and utilize information contained in one or more peripheral regions to maintain the face-lock and/or to recover the identity of a face quickly.

Of note, peripheral regions are generally more texture-based than face regions, such that peripheral regions are more invariant to acquisition conditions. Thus, when a face is first recognized, a process in accordance with certain embodiments extracts and records the textures of these one or more peripheral regions, and associates the peripheral regions, at least on a temporary basis, with the particular recognition profile.

In certain embodiments, the association of peripheral regions with a face region may be temporary in nature, such that the peripheral region data may include volatile data that will eventually be discarded, e.g., when the camera is switched off, or after a fixed time interval (e.g. 1 hour, 1 day), or when the camera moves to a new location which is removed from the current location by a certain distance (e.g. 1000 meters), or when manually reset by the user, or when the identified person is confirmed to have left the scene, or based on combinations of these and some other criteria.

An exemplary process is now described with reference to FIG. 1. At S1, a face is detected in a preview stream and tracking of this face is initiated. At S2, after a good face region FR1 is obtained from the tracked face, then a face pattern FP1 is extracted (referred to as a "faceprint"). Pattern matching is performed to recognize the face region FR1 if its faceprint FP1 matches a stored faceprint. The person corresponding to FR1 is thus identified as ID1 from a set of known persons. If no match is found, then the person FR1 may be marked as "unknown" unless or until a nickname is provided (a user may be prompted to provide a nickname, otherwise provided an opportunity to do so).

At S3, peripheral region data PRD1 are obtained and analyzed. This peripheral data PRD1 is stored and associated with the identified person from step 2. At S4, the camera continues to track the face region until "face lock" is lost. Before face lock is lost the identified person may be displayed with a tag or other identifier (e.g. writing a nickname beside their face in the display, or using a symbol identifier of selected and/or arbitrary type designated by a user). At S5, a new face FR2 is detected and tracking is initiated. The peripheral regions PRD2 around this face FR2 are extracted at S6. At S7, the PRD2 are compared with peripheral region data which is currently stored, e.g., such as PRD1 associated with lost face region FR1. If a match of PRIM and PRD2 is determined at S7, then at S9 the face FR2 is temporarily identified (and displayed) as being the person ID1 associated with this peripheral region data PRD2/PRD1, which is the same identifier ID1 used for FR 1 before it was lost. If no match can be determined, then the process stops at S8 and no identity information for this face is provided at this time.

At S10, after a good face region FR2 is obtained from the tracked face FR2, then a face pattern or faceprint FP2 is extracted. Pattern matching is performed to recognize the face FR2 and the person is thus identified at S12 from a set of known persons, or marked as "unknown" at S11. Where an identification ID1 was already provided by volatile data this can be confirmed at S12, or replaced at S11 by the identity from the recognition algorithm.

After S11, if peripheral regions and recognized identity did not match, then a new set of volatile peripheral region data PRD2 is created and associated with this new identity ID2. The camera continues to track this face region until "face lock" is lost displaying the identified person (e.g. writing a nickname beside their face in the display), as the process is basically returned with regard to FR2 and ID2 to S4. The volatile data PRD1 and PRD2 is stored within the camera until an extinction event (power-down, count-down, change of location or manual intervention or combinations thereof) occurs whereupon the volatile data is deleted.

Figure 2:
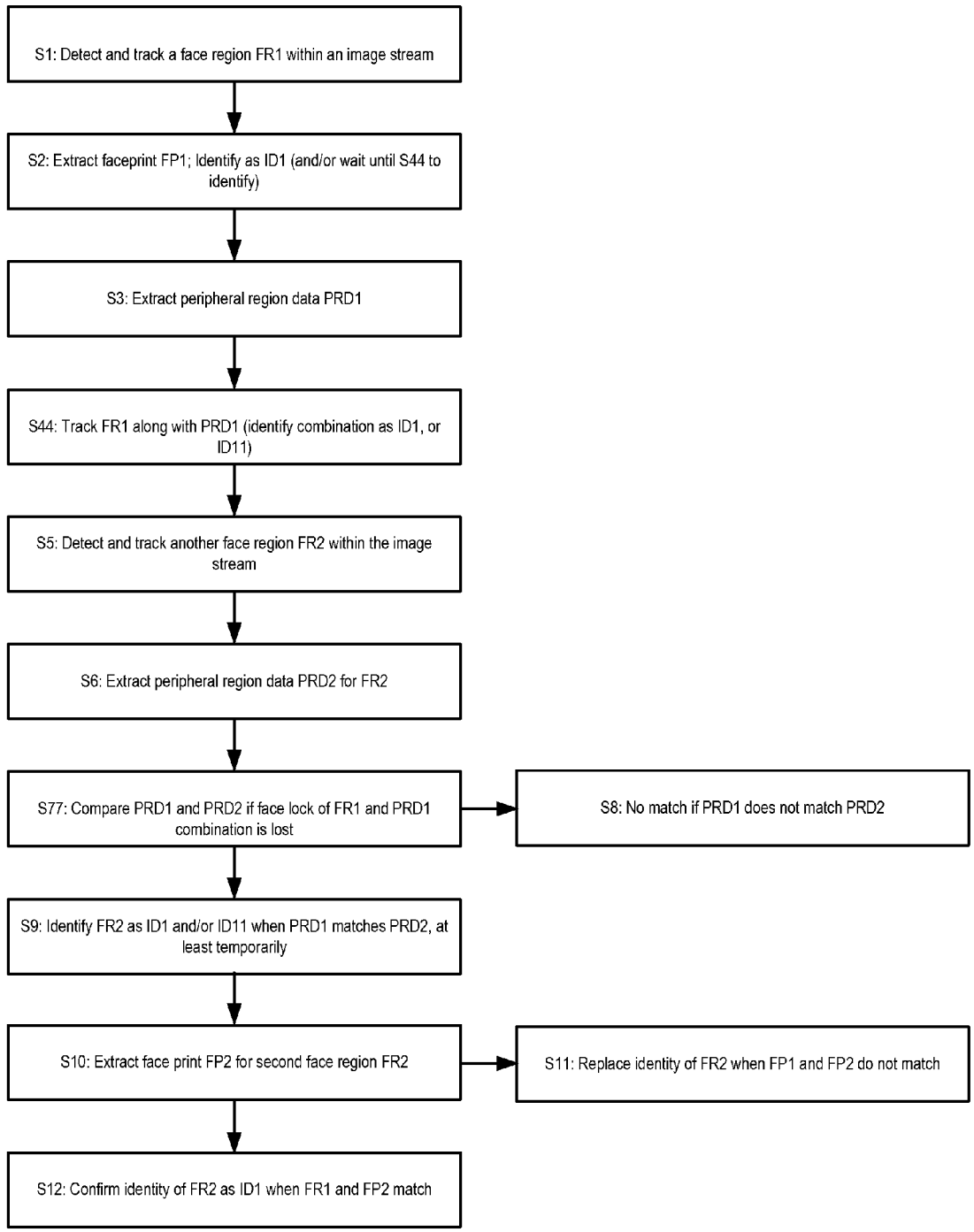
FIG. 2 illustrates exemplary processes in accordance with certain other embodiments.

Referring now to FIG. 2, S1-S3, S5-S6 and S8-S11 are same or similar to those described with reference to FIG. 1, and will not be reiterated here. At S44 in FIG. 2, peripheral region data PRD1 is tracked along with face region FR1. In this embodiment, PRD1 will be stored along with faceprint FP1 and not deleted with volatile memory on power-down. Either the combination of FR1 and PRD1 can be identified as ID1, or FR1 can be identified as ID1 as in FIG. 1, while the combination of FR1 and PRD1 is differently identified, e.g., as ID11. At S77, PRD1 and PRD2 are compared if face lock of FR1 and PRD1 is lost, although the face lock of this combined data is less likely to become lost than in the embodiment where only FR1 is tracked.

Alternative Embodiments

When a face detector fails, it may still be possible to retain a "face-lock" using other techniques than those described above, or a combination of techniques. For example, face regions have a skin color or skin tone that can be segmented from the background scene, such that even when a face region turns into a profile pose, it can still exhibit a relatively large region of skin color pixels. Thus a skin-color filter can be used to augment the face detector and improve the reliability of a face tracker. Other augmentation techniques can include luminance and edge filters. It is also possible to use stereo audio analysis to track the relative location of a face of a speaker in a scene without visually detecting the face. This can be useful in video conferencing systems, where it is desired to locate the speaker in a group of more than one person. The face tracker may in fact use a combination of techniques to constantly and reliably maintain a coherent lock on a tracked face region.

The face detection process' can tend to be relatively time-consuming, and so in some embodiments is not performed on every frame. In some cases, only a portion of each frame is scanned for faces with the face detector (see, e.g., U.S. Ser. No. 12/479,593, filed Jun. 5, 2009, which is assigned to the same assignee and is incorporated by reference), such that the entire frame is scanned over a number of frames, e.g., 5 or 10 frames. The frame portion to be scanned may be changed from frame to frame so that over a sequence of several frames the entire field of view is covered. Alternatively, after initial face detection is performed on the entirety of the image either in a single frame or a sequence of frames, the face detector can change to being applied just to the outside of the frame to locate new faces entering the field of view, while previously detected faces, which may also be recognized and identified, within the frame are tracked.

In certain face tracking systems within digital cameras, multiple faces (e.g., up to 9 in some cameras) can be independently tracked in a single scene. Such face tracker can still be very responsive and exhibit less than a few seconds time lag to detect a new face. The face tracker will independently track the movements of a relatively large number (e.g., nine or more) of faces. Tracking is smooth and highly responsive in almost all acquisition conditions, although at very low light levels performance may be significantly degraded.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,587,085, 7,587,068, 7,574,016, 7,565,030, 7,564,994, 7,558,408, 7,555,148, 7,551,755, 7,551,754, 7,545,995, 7,515,740, 7,471,846, 7,469,071, 7,469,055, 7,466,866, 7,460,695, 7,460,694, 7,440,593, 7,436,998, 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368 and 5,978,519; and U.S. published application nos. 2008/0175481, 2008/0013798, 2008/0031498, 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261 and 2007/0071347; and U.S. patent applications Ser. Nos. 10/764,339, 11/861,854, 11/573,713, 11/462,035, 12/042,335, 12/063,089, 11/761, 647, 11/753,098, 12/038,777, 12/043,025, 11/752,925, 11/767,412, 11/624,683, 60/829,127, 12/042,104, 11/856, 721, 11/936,085, 12/142,773, 60/914,962, 12/038,147, 11/861,257, 12/026,484, 11/861,854, 61/024,551, 61/019, 370, 61/023,946, 61/024,508, 61/023,774, 61/023,855, 61/221,467, 61/221,425, 61/221,417, 61/091,700, 61/182, 625, 61/221,455, 11/319,766, 11/673,560, 12/485,316, 12/374,040, 12/479,658, 12/479,593, 12/362,399, 12/191, 304, 11/937,377, 12/038,147, 12/055,958, 12/026,484, 12/554,258, 12/437,464, 12/042,104, 12/485,316, and 12/302,493.

The invention claimed is:

1. A method of recognizing faces in an image stream using a digital image acquisition device, comprising:
receiving a first acquired image from an image stream;
detecting a first face region within the first acquired image having a given size and a respective location within the first acquired image;
extracting first faceprint data uniquely identifying the first face region along with first peripheral region data around the first face region;
storing the first faceprint and peripheral region data, including associating the first peripheral region data with the first face region;
tracking the first face region until face lock is lost;
detecting a second face region within a second acquired image from the image stream;
extracting second peripheral region data around the second face region;
comparing the first and second peripheral region data;

identifying the second face region as a same identity as the first face region when the first peripheral region data matches the second peripheral region data; and confirming the second face region as said same identity as the first face region when the first and second face regions match.

2. The method of claim 1, wherein the storing of peripheral region data occurs only within volatile memory.

3. The method of claim 1, further comprising providing a database comprising an identifier and associated parameters for each of a number of one or more faces to be recognized; and selectively applying face recognition using said database to said first face region to provide an identifier for the first face region.

4. The method of claim 1, further comprising extracting second faceprint data uniquely identifying the second face region, and matching the first and second faceprint data, thereby confirming the identifying of the second face region.

5. The method of claim 1, wherein the detecting and identifying of the second face region occur within two second or less.

6. The method of claim 1, wherein the detecting and identifying of the second face region occur within one second or less.

7. The method of claim 1, further comprising displaying a same identifier with the first and second face regions.

8. The method of claim 7, wherein the identifier comprises a nickname of a person associated with the first and second face regions.

9. The method of claim 1, further comprising receiving a third acquired image from the image stream that has a higher resolution than the first and second acquired images, and identifying a third face region detected therein based upon matching the first faceprint with a third faceprint extracted from the third acquired image.

10. One or more non-transitory processor-readable storage media having code embedded therein for programming a processor to perform a method of recognizing faces in an image stream using a digital image acquisition device, wherein the method comprises:

receiving a first acquired image from an image stream;

detecting a first face region within the first acquired image having a given size and a respective location within the first acquired image;

extracting first faceprint data uniquely identifying the first face region along with first peripheral region data around the first face region;

storing the first faceprint and peripheral region data, including associating the first peripheral region data with the first face region;

tracking the first face region until face lock is lost;

detecting a second face region within a second acquired image from the image stream;

extracting second peripheral region data around the second face region; and comparing the first and second peripheral region data;

identifying the second face region as a same identity as the first face region when the first peripheral region data matches the second peripheral region data; and confirming the second face region as said same identity as the first face region when the first and second face regions match.

11. The one or more processor-readable media of claim 10, wherein the storing of peripheral region data occurs only within volatile memory.

12. The one or more processor-readable media of claim 10, wherein the method further comprises providing a database comprising an identifier and associated parameters for each of a number of one or more faces to be recognized; and selectively applying face recognition using said database to said first face region to provide an identifier for the first face region.

13. The one or more processor-readable media of claim 10, wherein the method further comprises extracting second faceprint data uniquely identifying the second face region, and matching the first and second faceprint data, thereby confirming the identifying of the second face region.

14. The one or more processor-readable media of claim 10, wherein the detecting and identifying of the second face region occur within two second or less.

15. The one or more processor-readable media of claim 10, wherein the detecting and identifying of the second face region occur within one second or less.

16. The one or more processor-readable media of claim 10, wherein the method further comprises displaying a same identifier with the first and second face regions.

17. The one or more processor-readable media of claim 16, wherein the identifier comprises a nickname of a person associated with the first and second face regions.

18. The one or more processor-readable media of claim 10, wherein the method further comprises receiving a third acquired image from the image stream that has a higher resolution than the first and second acquired images, and identifying a third face region detected therein based upon matching the first faceprint with a third faceprint extracted from the third acquired image.

19. A portable, digital image acquisition device, comprising a lens and image sensor for acquiring digital images, a processor, and a processor-readable medium having code embedded therein for programming the processor to perform a method of recognizing faces in an image stream using a digital image acquisition device, wherein the method comprises:

receiving a first acquired image from an image stream;

detecting a first face region within the first acquired image having a given size and a respective location within the first acquired image;

extracting first faceprint data uniquely identifying the first face region along with first peripheral region data around the first face region;

storing the first faceprint and peripheral region data, including associating the first peripheral region data with the first face region;

tracking the first face region until face lock is lost;

detecting a second face region within a second acquired image from the image stream;

extracting second peripheral region data around the second face region;

comparing the first and second peripheral region data;

identifying the second face region as a same identity as the first face region when the first peripheral region data matches the second peripheral region data; and confirming the second face region as said same identity as the first face region when the first and second face regions match.

20. The device of claim 19, wherein the storing of peripheral region data occurs only within volatile memory.

21. The device of claim 19, further comprising providing a database comprising an identifier and associated parameters for each of a number of one or more faces to be recognized; and selectively applying face recognition using said database to said first face region to provide an identifier for the first face region.

22. The device of claim 19, further comprising extracting second faceprint data uniquely identifying the second face region, and matching the first and second faceprint data, thereby confirming the identifying of the second face region.

23. The device of claim 19, wherein the detecting and identifying of the second face region occur within two second or less.

24. The device of claim 19, wherein the detecting and identifying of the second face region occur within one second or less.

25. The device of claim 19, further comprising displaying a same identifier with the first and second face regions.

26. The device of claim 25, wherein the identifier comprises a nickname of a person associated with the first and second face regions.

27. The device of claim 19, wherein the method further comprises receiving a third acquired image from the image stream that has a higher resolution than the first and second acquired images, and identifying a third face region detected therein based upon matching the first faceprint with a third faceprint extracted from the third acquired image.

28. A method of recognizing faces in an image stream using a digital image acquisition device, comprising:
receiving a first acquired image from an image stream;
detecting a first face region within the first acquired image having a given size and a respective location within the first acquired image;
extracting first faceprint data uniquely identifying the first face region along with first peripheral region data, including texture information, around the first face region; and retrieving texture information from the first and second peripheral region data; and identifying the second face region upon matching the texture information from the first and second peripheral region data.
storing the first faceprint and peripheral region data, including associating the first peripheral region data with the first face region;
tracking a first face region combination, including the first face region and peripheral region data, until face lock is lost; and
identifying the first face region as a first identity based at least in part on the texture information,
extracting second peripheral region data for a second detected face region after said face lock is lost;
comparing the first and second peripheral region data;
identifying the second face region as a same identity as the first face region when the first peripheral region data matches the second peripheral region data; and
confirming the second face region as said same identity as the first face region when the first and second face regions match.

29. The method of claim 28, further comprising providing a database comprising an identifier and associated parameters for each of a number of one or more faces to be recognized; and selectively applying face recognition using said database to said first face region combination to provide an identifier for the first face region combination.

30. The method of claim 29, further comprising retrieving and matching texture information from the first peripheral region data for comparing with texture information from a stored peripheral region.

31. The method of claim 28, wherein the method further comprises receiving a third acquired image from the image stream that has a higher resolution than the first and second acquired images, and identifying a third face region detected therein based upon matching the first faceprint with a third faceprint extracted from the third acquired image.

32. One or more non-transitory processor-readable storage media having code embedded therein for programming a processor to perform a method of recognizing faces in an image stream using a digital image acquisition device, wherein the method comprises:
receiving a first acquired image from an image stream;
detecting a first face region within the first acquired image having a given size and a respective location within the first acquired image;
extracting first faceprint data uniquely identifying the first face region along with first peripheral region data, including texture information, around the first face region;
storing the first faceprint and peripheral region data, including associating the first peripheral region data with the first face region;
tracking a first face region combination, including the first face region and peripheral region data, until face lock is lost; and
identifying the first face region as a first identity based at least in part on the texture information,
extracting second peripheral region data for a second detected face region after said face lock is lost;
comparing the first and second peripheral region data;
identifying the second face region as a same identity as the first face region when the first peripheral region data matches the second peripheral region data; and
confirming the second face region as said same identity as the first face region when the first and second face regions match.

33. The one or more processor-readable media of claim 32, wherein the method further comprises providing a database comprising an identifier and associated parameters for each of a number of one or more faces to be recognized; and selectively applying face recognition using said database to said first face region combination to provide an identifier for the first face region combination.

34. The one or more processor-readable media of claim 33, wherein the method further comprises retrieving and matching texture information from the first peripheral region data for comparing with texture information from a stored peripheral region.

35. The one or more processor-readable media of claim 32, wherein the method further comprises receiving a third acquired image from the image stream that has a higher resolution than the first and second acquired images, and identifying a third face region detected therein based upon matching the first faceprint with a third faceprint extracted from the third acquired images.

36. A portable, digital image acquisition device, comprising a lens and image sensor for acquiring digital images, a processor, and a processor-readable medium having code embedded therein for programming the processor to perform a method of recognizing faces in an image stream using a digital image acquisition device, wherein the method comprises:
receiving a first acquired image from an image stream;
detecting a first face region within the first acquired image having a given size and a respective location within the first acquired image;
extracting first faceprint data uniquely identifying the first face region along with first peripheral region, including texture information, around the first face region;
storing the first faceprint and peripheral region data, including associating the first peripheral region data with the first face region;

tracking a first face region combination, including the first face region and peripheral region data, until face lock is lost; and identifying the first face region as a first identity based at least in part on the texture information, extracting second peripheral region data for a second detected face region after said face lock is lost;

comparing the first and second peripheral region data;

identifying the second face region as a same identity as the first face region when the first peripheral region data matches the second peripheral region data; and confirming the second face region as said same identity as the first face region when the first and second face regions match.

37. The device of claim 36, wherein the method further comprises providing a database comprising an identifier and associated parameters for each of a number of one or more faces to be recognized; and selectively applying face recognition using said database to said first face region combination to provide an identifier for the first face region combination.

38. The device of claim 37, wherein the method further comprises retrieving and matching texture information from the first peripheral region data for comparing with texture information from a stored peripheral region.

39. The device of claim 36, wherein the method further comprises receiving a third acquired image from the image stream that has a higher resolution than the first and second acquired images, and identifying a third face region detected therein based upon matching the first faceprint with a third faceprint extracted from the third acquired image.

* * * * *